(12) United States Patent
Datta et al.

(10) Patent No.: US 10,996,334 B2
(45) Date of Patent: May 4, 2021

(54) SYSTEM AND METHOD FOR IMPROVING THE RESOLUTION AND SENSITIVITY OF LIDAR

(71) Applicant: Discovery Semiconductors, Inc., Ewing, NJ (US)

(72) Inventors: Shubhashish Datta, Ewing, NJ (US); Abhay Joshi, Ewing, NJ (US)

(73) Assignee: Discovery Semiconductors, Inc., Ewing, NJ (US)

( * ) Notice: Subject to any disclaimer, the term of this patent is extended or adjusted under 35 U.S.C. 154(b) by 350 days.

(21) Appl. No.: 16/277,931

(22) Filed: Feb. 15, 2019

(65) Prior Publication Data

US 2019/0265359 A1    Aug. 29, 2019

Related U.S. Application Data

(60) Provisional application No. 62/634,441, filed on Feb. 23, 2018.

(51) Int. Cl.
| | |
|---|---|
| *G01C 3/08* | (2006.01) |
| *G01S 17/34* | (2020.01) |
| *G01S 7/4913* | (2020.01) |
| *G01S 7/4911* | (2020.01) |

(52) U.S. Cl.
CPC ............ *G01S 17/34* (2020.01); *G01S 7/4911* (2013.01); *G01S 7/4913* (2013.01)

(58) Field of Classification Search
CPC .... G01S 7/4913; G01S 7/4814; G01S 7/4915; G01S 7/4911; G01S 17/34

USPC ......................................................... 356/5.01
See application file for complete search history.

(56) References Cited

U.S. PATENT DOCUMENTS

| | | | |
|---|---|---|---|
| 6,356,677 B1 | 3/2002 | Hall | |
| 6,393,377 B1 | 5/2002 | Shirai et al. | |
| 6,580,497 B1 * | 6/2003 | Asaka | ..................... G01S 17/95 356/28.5 |
| 8,072,582 B2 | 12/2011 | Meneely | |

(Continued)

FOREIGN PATENT DOCUMENTS

| | | |
|---|---|---|
| EP | 0379609 | 8/1990 |
| EP | 1712888 | 10/2006 |

(Continued)

*Primary Examiner* — Mark Hellner
(74) *Attorney, Agent, or Firm* — LaMorte & Associates P.C.

(57) ABSTRACT

A lidar system where a laser creates a laser output and the sequence generator creates a pseudorandom noise sequence. The laser output is directed into two paths. On the first path, the laser output is directed to a first modulator. The first modulator encodes the laser output with the pseudorandom noise sequence to produce an encoded output signal. The encoded output signal is amplified and directed toward a target, wherein a back-scattered signal is reflected back from the target. On the second path, the laser output is directed to a second modulator. The second modulator modulates the laser output to produce an oscillator signal. The back-scattered signal is aligned and is mixed with the oscillator signal from the second modulator. The resulting mixed signal is converted into a corresponding RF output signal. The RF output signal is cross-correlated with the pseudorandom noise sequence to acquire target data.

20 Claims, 4 Drawing Sheets

(56) References Cited

U.S. PATENT DOCUMENTS

| | | |
|---|---|---|
| 2005/0231710 A1 | 10/2005 | Jamieson et al. |
| 2006/0227315 A1 | 10/2006 | Beller |
| 2007/0215795 A1 | 9/2007 | Kameyama et al. |
| 2008/0074640 A1 | 3/2008 | Walsh et al. |
| 2010/0045965 A1 | 2/2010 | Meneely |

FOREIGN PATENT DOCUMENTS

| | | | | |
|---|---|---|---|---|
| EP | 002157445 A2 * | 2/2010 | ............. | G01S 17/10 |
| EP | 2157445 A2 * | 2/2010 | ............. | G01S 17/10 |
| GB | 2384126 | 7/2003 | | |

* cited by examiner

| SEQUENCE | GENERATOR POLYNOMIAL | SPACIAL RESOLUTION | SENSITIVITY | CORRELATION TIME |
|---|---|---|---|---|
| Bypass | N/A | 1.5 cm | 1 µW | 100 ps |
| PRN3 | $x^3 + x + 1$ | 11 cm | 140 nW | 700 ps |
| PRN4 | $x^4 + x + 1$ | 23 cm | 67 nW | 1.5 ns |
| PRN5 | $x^5 + x^2 + 1$ | 47 cm | 32 nW | 3.1 ns |
| PRN6 | $x^6 + x + 1$ | 95 cm | 16 nW | 6.3 ns |
| PRN7 | $x^7 + x^2 + 1$ | 1.9 m | 7.9 nW | 13 ns |
| PRN9 | $x^9 + x^4 + 1$ | 7.7 m | 1.9 nW | 51 ns |
| PRN10 | $x^{10} + x^3 + 1$ | 15 m | 980 pW | 100 ns |
| PRN11 | $x^{11} + x^2 + 1$ | 31 m | 490 pW | 200 ns |
| PRN15 | $x^{15} + x + 1$ | 490 m | 30 pW | 3.3 µs |
| PRN17 | $x^{17} + x^3 + 1$ | 1.9 km | 7.6 pW | 13 µs |

FIG. 3

SYSTEM AND METHOD FOR IMPROVING THE RESOLUTION AND SENSITIVITY OF LIDAR

RELATED APPLICATIONS

This application claims the benefit of U.S. Provisional Patent Application No. 62/634,441, filed Feb. 23, 2018.

BACKGROUND OF THE INVENTION

1. Field of the Invention

In general, the present invention relates to lidar systems that are used to obtain precision measurements. More particularly, the present invention relates to lidar systems that have resolution settings and sensitivity settings that can be selectively adjusted.

2. Prior Art Description

Lidar is commonly considered an acronym for "light detection and ranging". Lidar systems are used to illuminate a remote target with a laser beam. The lidar system analyzes the reflected and back-scattered optical signals to determine various properties of the target, such as location, velocity, and material composition. The reflected laser light is received by an array of optical sensors. The optical sensors can vary significantly in their temporal resolution and sensitivity. The sensitivity of the optical sensors is determined by the lowest reflected or back-scattered optical power level that can be detected by the optical sensors.

The sensitivity and resolution required by a lidar system is typically determined by the application. For example, lidar sensors for hypersonic wind tunnels need a large bandwidth and fine spatial resolution to analyze the gigahertz-scale Doppler shifts of the flow patterns. Accordingly, such a lidar system would need fine temporal resolution. In contrast, a satellite based lidar system that is used to monitor atmospheric conditions may only require a bandwidth of several kilohertz for kilometer-scale spatial resolution. This is because satellite based lidars characterize distant targets that are thousands of kilometers away and operate with low levels of back-scattered signals. Accordingly, lidar systems are typically custom built to the exact needs of the application. The customization of lidar systems makes the systems expensive to produce. The customization of lidar systems also makes the lidar systems difficult to adapt to secondary equipment. Thus, a lidar system created for an older application often cannot be salvaged for use in an upgraded application.

In the prior art, lidar systems have been designed that integrate pseudorandom sequences into the emitted laser signal. Such prior art system uses the pseudorandom sequence to help identify a time delay between a transmitted light pulse and the reflected light pulse. Such prior art systems are exemplified by U.S. Patent Application Publication No. 2010/0045965 to Meneely. Although pseudorandom sequences are used in the prior art, such techniques have not been adapted for use in adjusting the sensitivity and resolution of a lidar system so that one lidar system can be adapted for use in different applications.

A need therefore exists for an improved lidar system that is designed to work for a diverse range of applications, wherein the lidar system has a widely adjustable temporal resolution and a widely adjustable sensitivity level. This need is met by the present invention as described below.

SUMMARY OF THE INVENTION

The present invention is a lidar system that uses a continuous wave laser and a sequence generator. The laser creates a laser output and the sequence generator creates a pseudorandom noise sequence. The laser output is directed into two paths. On the first path, the laser output is directed to a first modulator. The first modulator encodes the laser output with the pseudorandom noise sequence to produce an encoded output signal. The encoded output signal is amplified and directed toward a target, wherein a back-scattered signal is reflected back from the target.

On the second path, the laser output is directed to a second modulator. The second modulator modulates the laser output to produce an oscillator signal. The back-scattered signal is aligned and is mixed with the oscillator signal from the second modulator. The resulting mixed signal is converted into a corresponding RF output signal. The RF output signal is cross-correlated with the pseudorandom noise sequence to acquire target data. The pseudorandom sequence has a periodic length that selectively determines the overall temporal resolution of the lidar system.

BRIEF DESCRIPTION OF THE DRAWINGS

For a better understanding of the present invention, reference is made to the following description of exemplary embodiments thereof, considered in conjunction with the accompanying drawings, in which:

FIG. 3 is a table that shows data for resolution, sensitivity and correlation time for selected pseudorandom number sequences utilized by the exemplary lidar system.

DETAILED DESCRIPTION OF THE DRAWINGS

The present invention lidar system can be adapted for use in many applications. For example, the lidar system can be used to measure the thermometry and spectroscopy of rocket plumes and jet engine flames with centimeter scale resolution. The lidar system can be used for laser Doppler velocimetry in wind tunnels. The lidar system can also be used for navigation and landing of aircraft and spacecraft that require velocity and altitude measurements with sub-meter accuracy. Higher resolution applications include turbulence measurements having 10 m or higher resolution and environmental sensing having 1 km resolution. Although the lidar system can be used in many such applications, only two exemplary applications are illustrated and described. The exemplary embodiments are selected in order to set forth two of the best modes contemplated for the invention. The illustrated embodiments, however, are merely exemplary and should not be considered limitations when interpreting the scope of the appended claims.

Figure 1:
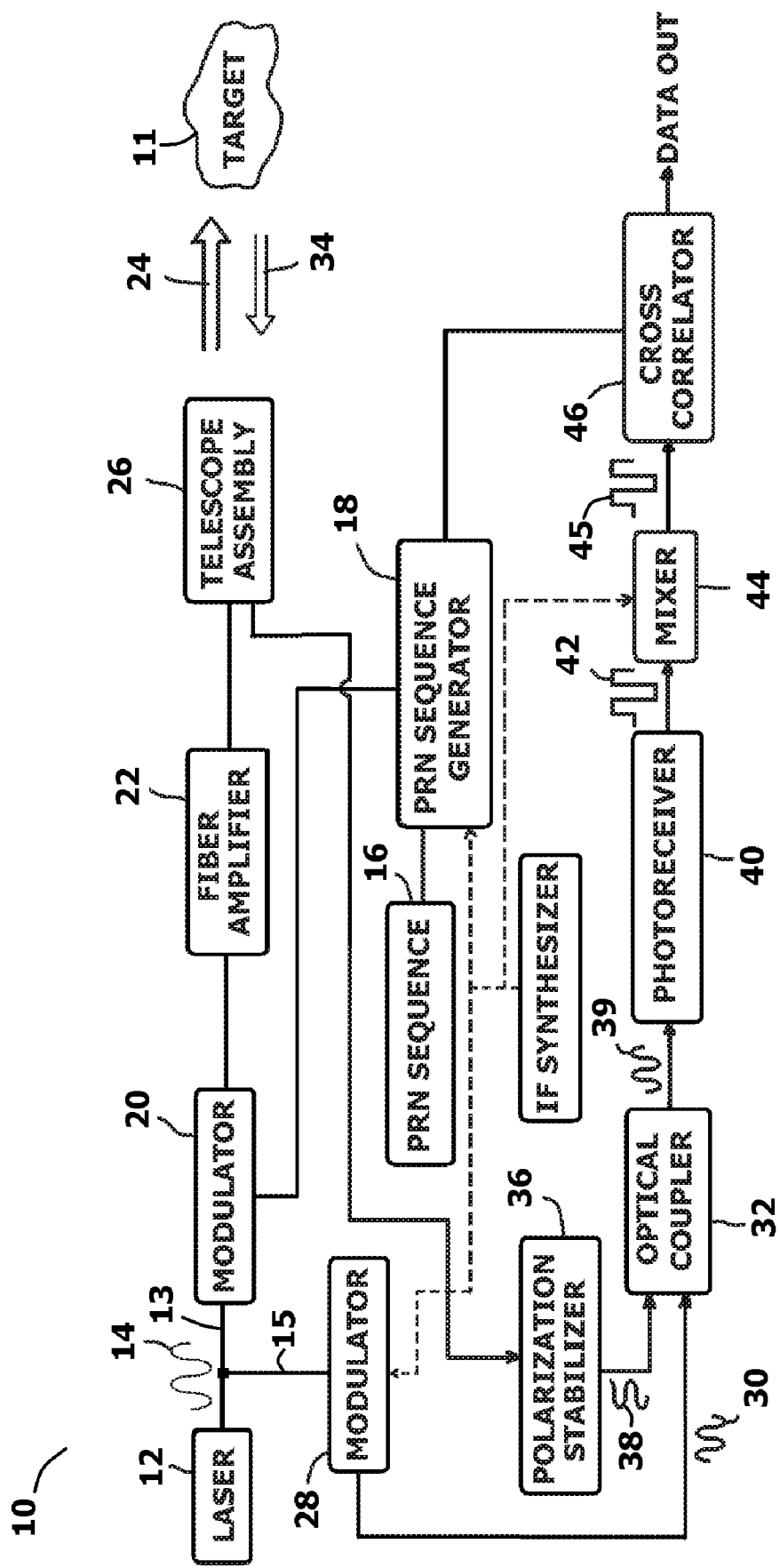
FIG. 1 is a schematic of an exemplary lidar system in accordance with the present invention.

Referring to FIG. 1, a self-heterodyne lidar system 10 is shown that uses a pseudorandom noise (PRN) sequence for adjusting both resolution and sensitivity. The lidar system 10 shown utilizes a continuous wave laser 12. In the shown example, the laser 12 has a two micron wavelength laser output 14. The use of such a laser setting minimizes atmospheric propagation losses. Furthermore, the laser setting enables compact fibered components that are resilient to mechanical vibrations to be used throughout the lidar system 10. However, it should be understood that the two micron wavelength setting for the laser 12 is exemplary and other operating wavelengths, such as 850 nm, 1064 nm, 1310 nm, or 1550 nm, can also be used within the lidar system 10. The laser 12 can have one of many operating wavelengths, provided the outputs are multiplexed in time of frequency domains.

The output 14 of the laser 12 is directed into two paths. The first path 13 leads to a first modulator 20. The second path 15 leads to a second modulator 28. The laser output 14 may be directed into the two paths 13, 15 in many ways. For example, the laser output 14 can be directed into two optical fibers or the laser output 14 can be directed through a beam splitter or similar optical device.

The laser 12 is modulated by a 10 Gbps pseudorandom noise (PRN) sequence 16 that is produced by a programmable PRN sequence generator 18. The resolution and sensitivity of the lidar system 10 can be adjusted by choosing the appropriate PRN sequence 16 for the application. This architecture takes advantage of fiber optical components to reduce size, weight, and power.

The PRN sequence 16 produced by the PRN sequence generator 18 is received by the first modulator 20, such as a Mach-Zhender amplitude modulator. The first path 13 of the laser output 14 from the laser 12 is also received by the first modulator 20. The laser output 14 is encoded with the 10 Gigabit per second PRN sequence 16 produced by the PRN sequence generator 18. The PRN sequence 16 has a periodic length that determines the overall temporal resolution of the lidar system 10.

Figure 2:
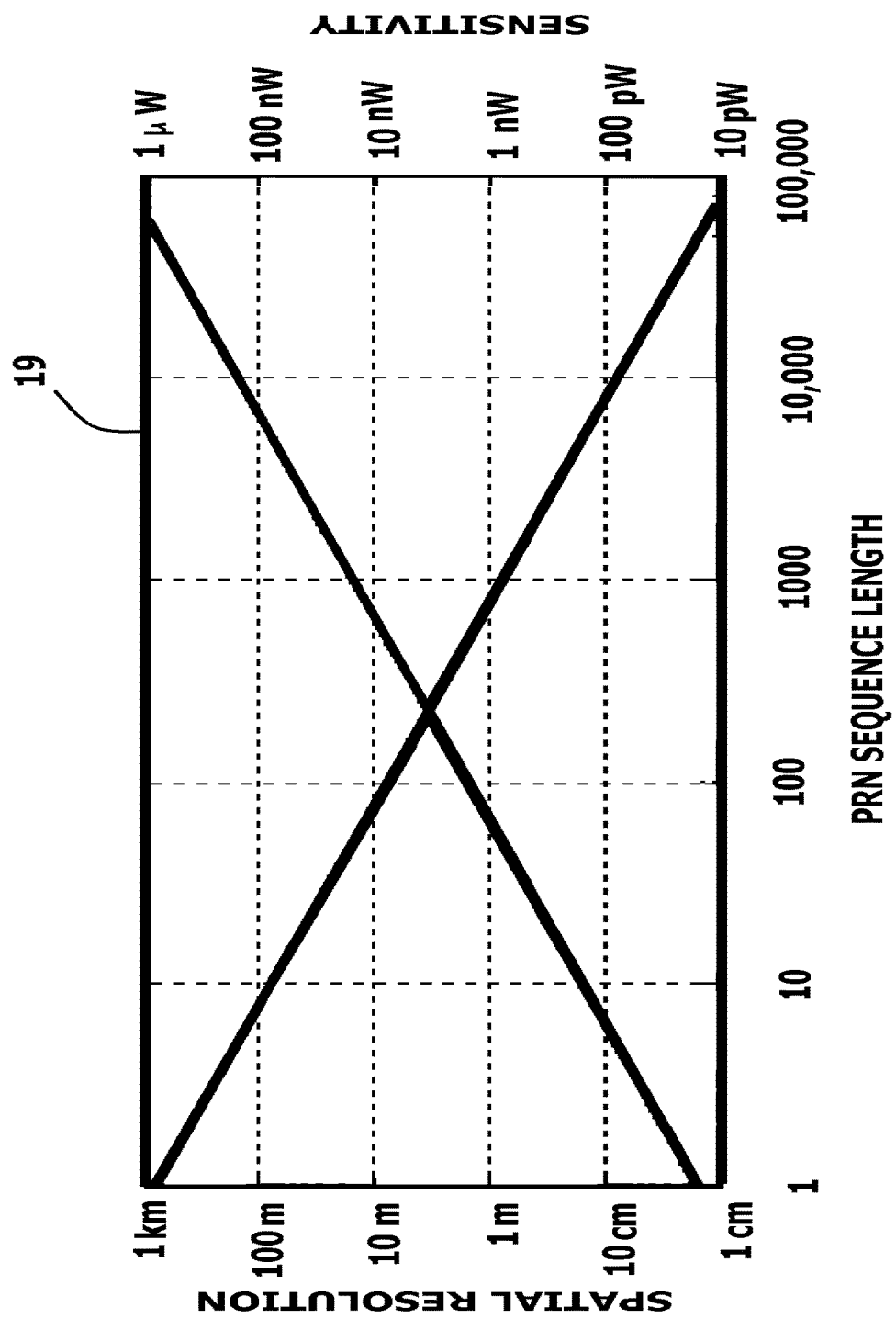
FIG. 2 is a graph that plots both resolution and sensitivity as a function of a pseudorandom number sequence utilized by the exemplary lidar system.

The PRN sequence 16 is preferably a maximal length sequence, where N high-speed shift registers are used to generate noise-like signals, with a periodicity of $2^N-1$. For example, a 10 Gbps, $2^7-1$ PRN sequence 16 provides a temporal resolution of {100 ps Bit Period×127 PRN Sequence Length=12.7 ns}, which is equivalent to a resolution of 1.9 m of spatial resolution along the propagation direction. The resolution can be maximized to 100 ps, i.e. 1.5 cm, by programming the PRN generator 18 to emit alternating "1" and "0" bits. Referring to FIG. 2 in conjunction with FIG. 1, a graph 19 is shown that plots the adjustability of spatial resolution and sensitivity of the lidar system 10 as a function of the length of the PRN sequence 16.

Returning to FIG. 1, it can be seen that the output from the first modulator 20 is received by a fiber amplifier 22. The fiber amplifier 22 amplifies the output to produce an optical output signal 24. In the exemplary embodiment, the fiber amplifier 22 is a thulium-doped fiber amplifier, so as to be optimized for the two-micron setting of the laser 12. Other doping material can be used for other wavelengths. For example, erbium can be a doping material for an operating frequency of 1550 nm. Praseodymium can be a doping material for an operating frequency of 1310 nm. Ytterbium can be a doping material for an operating frequency of 1064 nm, and neodymium can be a doping material for an operating frequency of 850 nm.

The optical output signal 24 is forwarded to a telescope assembly 26 that directs the optical output signal 24 toward a target 11. The telescope assembly 26 can be any series of lenses and/or reflectors needed in an application to direct the optical output signal 24 toward the target 11 and collect back-scatter that is reflected from the target 11.

The laser output 14 directed into the second path 15 is not directed toward the target 11. This portion of the output signal 14 is forwarded to the second modulator 28. The second modulator 28 sinusoidally modulates the laser output 14 at a 10 GHz intermediate frequency to produce a heterodyne local oscillator signal 30. The heterodyne local oscillator signal 30 is directed toward an optical coupler 32.

The telescope assembly 26 is used to illuminate a target 11 and receive the back-scattered signal 34. The back-scattered signal 34 is aligned using a polarization stabilizer 36. The aligned signal output 38 by the polarization stabilizer 36 is directed to the optical coupler 32, wherein the optical coupler 32 mixes the aligned signal output 38 with the heterodyne local oscillator signal 30 to produce a mixed signal 39. The mixed signal 39 is advanced to photoreceiver 40, such as a 20 GHz balanced photoreceiver.

The photoreceiver 40 converts the optical mixed signal 39 to an RF output 42. The RF output 42 is received by a double balanced mixer 44. The double balanced mixer 44 down-converts the RF output 42 to baseband, therein creating a demodulated signal 45. The demodulated signal 45 is then directed to a cross-correlator 46 that cross-correlates the demodulated signal 45 from the double balanced mixer 44 with the transmitted PRN sequence 16 produced by the PRN sequence generator 18. The cross-correlator 46 then generates the target data in the desired sensitivity and resolution.

Typical implementation of an ultrafast PRN sequence 16 of length $2^N-1$ utilizes an N-element shift register driving N−1 element adder arrays with pre-defined taps in a feedback loop. It is understood that only specific combinations of tap locations that are defined by the sequence generator polynomial can lead to the desired noise-like autocorrelation function.

Referring to FIG. 3 in conjunction with FIG. 1, exemplary simulated system parameters are used to further explain operations. FIG. 3 shows a table 51 that describes the correlation between generator polynomials 47, special resolution 48 and correlation time 49 for the PRN sequences 16 used by the lidar system 10. The instantaneous signal-to-noise ratio is independent of the PRN modulation. As such, the cross-correlation process is akin to averaging and improves the sensitivity of the lidar system 10 commensurate to the PRN pattern length. As shown in the table 51 of FIG. 3, the longest PRN sequence (PRN17) requires a correlation time window of only 13 ns at a 10 Gbps rate, and thus, introduces minimal overhead for signal processing.

In the lidar system 10 shown in FIG. 1, the lidar architecture relies on a polarization stabilizer 36 to lock to the dominant polarization state of the received optical signal. As a consequence, a single-polarization system is produced. However, certain applications exist that would benefit from a polarization diversity system to better characterize material properties of the target. Such an alternate system is shown in FIG. 4.

Figure 4:
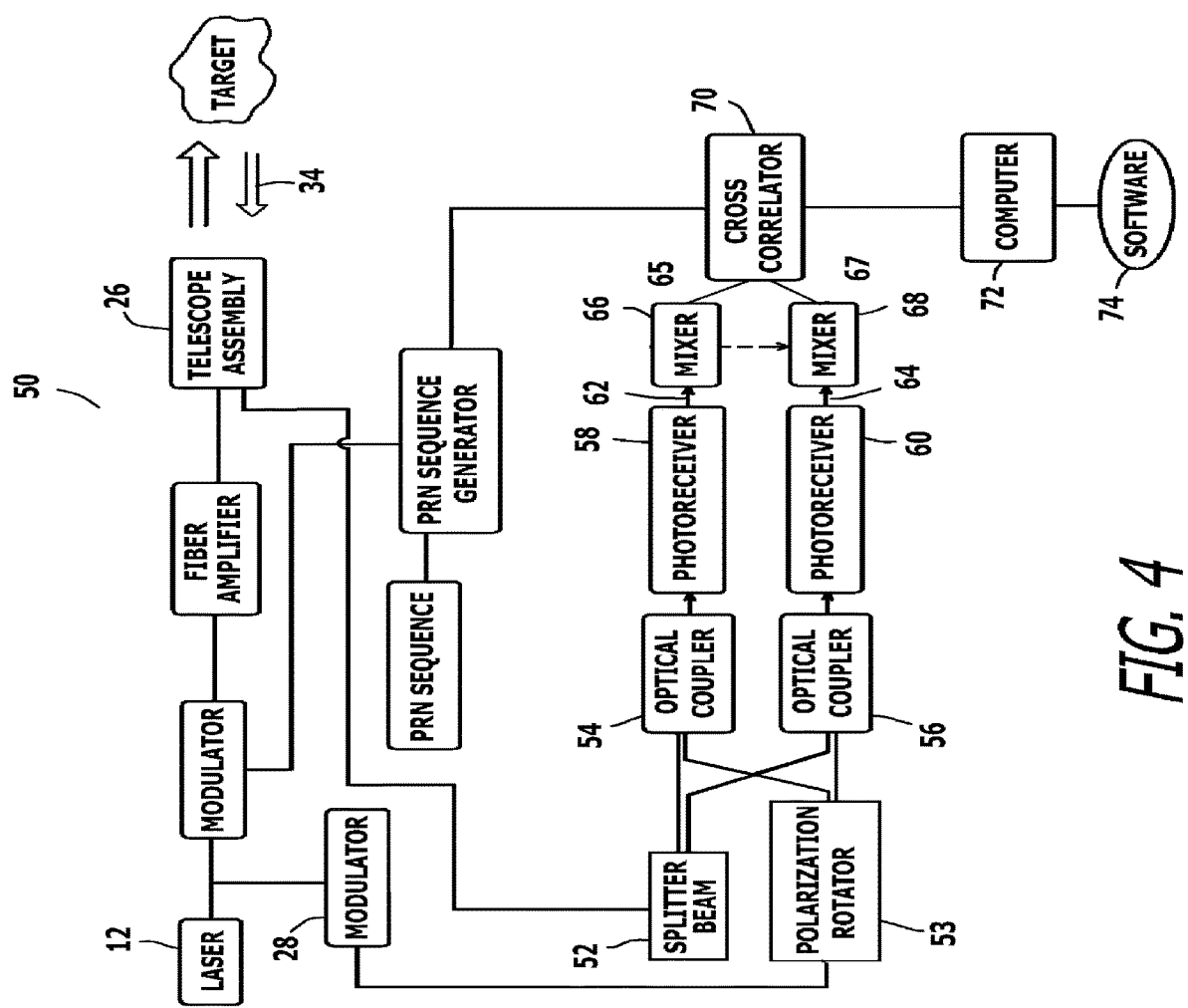
FIG. 4 is a schematic of an alternate embodiment of an exemplary lidar system that utilizes polarization diversity.

Referring to FIG. 4, a lidar system 50 is shown having the same laser 12, second modulator 28, telescope assembly 26 and PRN sequence generator 18 as the first embodiment. Since these components are the e same as the embodiment of FIG. 1, the same reference numbers are maintained.

The laser output 14 is modulated and forwarded to a polarization rotator 53. The back-scattered signal 34 from the telescope assembly 26 is directed toward a beam splitter 52, such as polarizing beam splitter. A first coupler 54 and a second coupler 56 are provided. The first coupler 54 and the second coupler 56 are both cross-linked to the beam splitter 52 and the polarization rotator 53. A first photoreceiver 58 and a second photoreceiver 60 are provided that receive the respective signal outputs of the first coupler 54 and the second coupler 56. The first photoreceiver 58 and the second photoreceiver 60 produce two RF outputs 62, 64, respectively. The two RF outputs 62, 64 are received by two double balanced mixers 66, 68. The double balanced mixers 66, 68 down-convert the RF outputs 62, 64 to baseband, therein producing two demodulated signals 65, 67. The demodulated signals 65, 67 are then directed to a cross-correlator 70 that cross-correlates the demodulated signals 65, 67 from the two double balanced mixers 66, 68 with the transmitted PRN sequence 16 produced by the PRN sequence generator 18. The cross-correlator 70 then generates the target data in the selected sensitivity and resolution as determined by the PRN sequence 16.

The addition of polarization diversity into the lidar system 50, enables a determination of material properties through computation of polarization contrast. Accordingly, a computer 72 that runs the lidar control software 74 can be provided as part of the lidar system 50 in order to obtain material property analysis.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A lidar system comprising;
    a laser having a laser output that is split into a first path and a second path;
    a sequence generator that generates a pseudorandom noise sequence;
    a first modulator that encodes said laser output on said first path with said pseudorandom noise sequence to produce an encoded output signal, wherein said encoded output signal is amplified and directed toward a target, and wherein a back-scattered signal is reflected back from said target;
    a second modulator that modulates said laser output on said second path to produce an oscillator signal;
    a polarization stabilizer that receives said back-scattered signal and produces an aligned signal;
    an optical coupler that mixes said aligned signal with said oscillator signal to produce a mixed signal;
    a photoreceiver that receives said mixed signal and converts said mixed signal to an RF output; and
    a cross-correlator that cross-correlates the RF output with said pseudorandom noise sequence to acquire target data.

2. The system according to claim 1, wherein said sequence generator is programmable and said pseudorandom noise sequence has an adjustable periodicity.

3. The system according to claim 1, further including a balanced mixer that down-converts said RF output to a baseband, prior to said RF output being received by said cross-correlator.

4. The system according to claim 1, wherein said pseudorandom noise sequence is a ten gigabit per second sequence.

5. The system according to claim 1, further including a telescope assembly for directing said encoded output signal toward said target.

6. The system according to claim 1, further including an amplifier for amplifying said encoded output signal.

7. The system according to claim 1, wherein said second modulator sinusoidally modulates said laser output on said second path.

8. The system according to claim 1, wherein said lidar system has a temporal resolution and said pseudorandom noise sequence has a periodic length, wherein said temporal resolution is determined by said periodic length.

9. The system according to claim 1, wherein said laser is a continuous wave laser.

10. The system according to claim 8, wherein said laser has multiple wavelengths that are multiplexed in time of frequency domains.

11. The system according to claim 5, wherein said amplifier is a doped fiber amplifier.

12. A lidar system comprising;
    a laser having a laser output that is split into a first path and a second path;
    a sequence generator that generates a pseudorandom noise;
    a first modulator that encodes said laser output on said first path with said pseudorandom noise sequence to produce an encoded output signal, wherein said encoded output signal is amplified and directed toward a target, and wherein a back-scattered signal is reflected back from said target;
    a second modulator that modulates said laser output on said second path to produce an oscillator signal;
    a beam splitter that receives said back-scattered signal;
    a polarization rotator that receives said oscillator signal;
    optical couplers cross-linked to said beam splitter and said polarization rotator, wherein said coupler produces two signal outputs;
    photoreceivers that receive said signal outputs and cover said signal outputs to RF output signals;
    mixers that mix said RF output signals; and
    a cross-correlator that cross-correlates the RF output signals with said pseudorandom noise sequence to acquire target data.

13. The system according to claim 12, wherein said sequence generator is programmable and said pseudorandom noise sequence has an adjustable periodicity.

14. The system according to claim 12, wherein said pseudorandom noise sequence is a ten gigabit per second sequence.

15. The system according to claim 12, further including a telescope assembly for directing said encoded output signal toward said target.

16. The system according to claim 12, further including an amplifier for amplifying said encoded output signal.

17. The system according to claim 12, wherein said lidar system has a temporal resolution and said pseudorandom noise sequence has a periodic length, wherein said temporal resolution is determined by said periodic length.

18. The system according to claim 12, wherein said laser is a continuous wave laser.

19. The system according to claim 12, wherein said laser has multiple wavelengths that are multiplexed in time of frequency domains.

20. The system according to claim 14, wherein said amplifier is a doped fiber amplifier.

* * * * *